Figure 1:
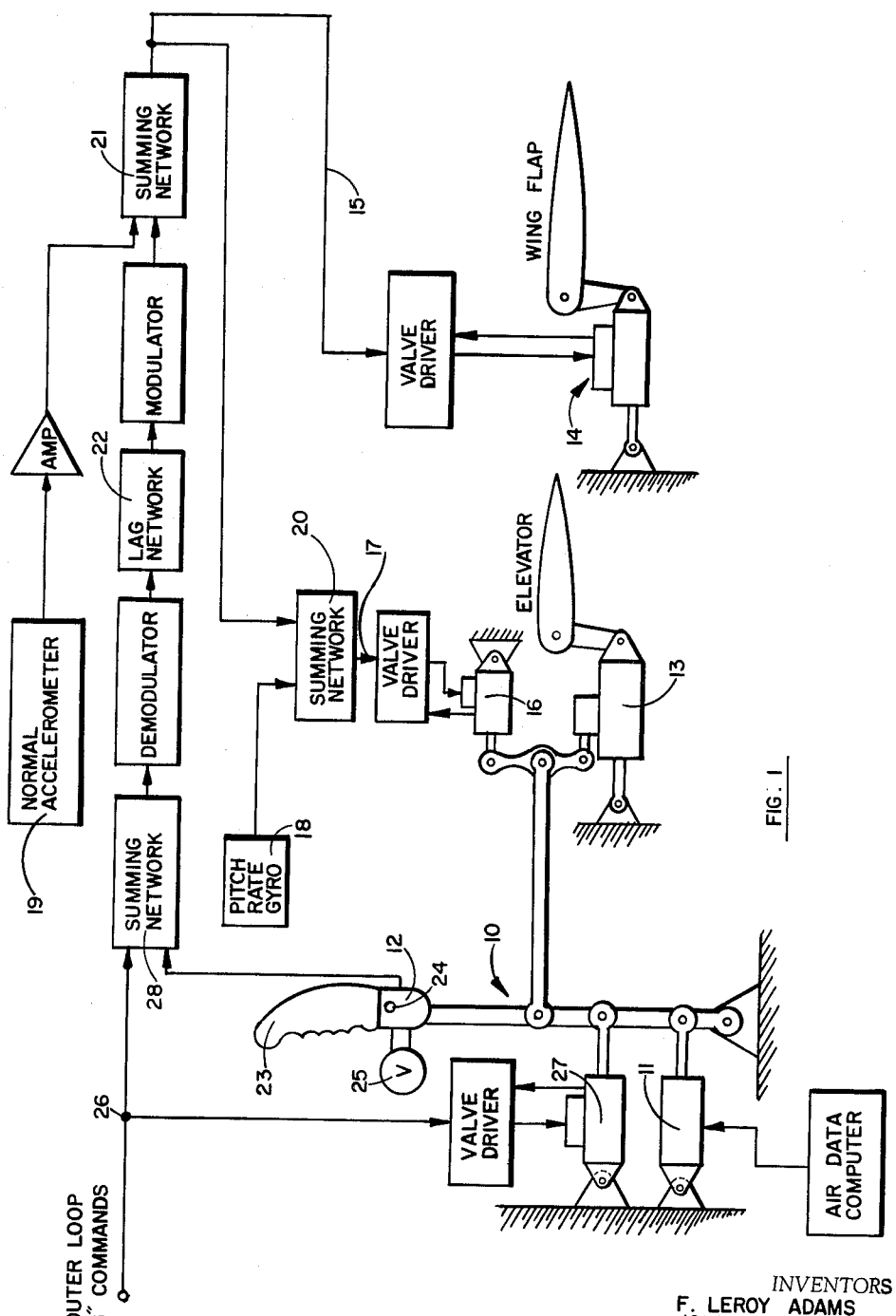

Feb. 22, 1966    F. LE ROY ADAMS ETAL    3,236,478
FLIGHT CONTROL SYSTEM
Filed April 23, 1964

INVENTORS
F. LEROY ADAMS
JOHN D. BALDUCCI
BY
Roy M. Pitts
ATTORNEY 3,236,478
FLIGHT CONTROL SYSTEM
F Le Roy Adams, Orange, and John D. Balducci, Placentia, Calif., assignors to North American Aviation, Inc.
Filed Apr. 23, 1964, Ser. No. 362,074
8 Claims. (Cl. 244—76)

The device of the subject invention relates to an improved flight controller, and more particularly to means for improving the controlled response of an aerospace vehicle such as an airplane and the like.

In the flight control of airplanes and the like, it is desired to conveniently induce pitching moments and vertical accelerations in order to effect and maintain a selected or desired flight path. At the same time it is desired to minimize the response of the controlled vehicle to moments and accelerations induced by atmospheric turbulences (known as "gusts"), for the reason that such gusts produce discomfort to human passengers; alter the flight trajectory; and may apply incremental accelerations which, when added to pilot-induced command accelerations, may exceed the safe structural limits of the vehicle.

In the prior art of flight control, such command control has been effected through a set of elevators, for example, the controlled displacement of which exert both lift (e.g., normal acceleration) upon, and pitching moments about, the center-of-gravity of the aircraft. Closed loop control arrangements have been employed for improving the vehicle response to command inputs, and for augmenting the flight stability performance or damping.

Gust alleviation devices for such prior art airframes have variously employed sensing means for resisting and regulating aircraft response to normal accelerations, employing pilot-initiated, control-stick operated signalling or switching devices, whereby the aircraft regulating means is disabled during pilot-induced accelerations. Hence, no gust alleviation occurs during the performance of a pilot-induced maneuver. Other types of control systems have not distinguished between the sources of the acceleration, but have only sought to limit it, thereby compromising the aircraft response to a command input, in order to achieve gust alleviation.

Therefore, it is a broad object of the subject invention to provide improved flight control means for effecting gust alleviation while not compromising vehicle response to a command-control input.

According to the concept of the subject invention, signal-cancellation means generates a signal analog of a pilot-induced maneuver, for cancelling such portion of the sensed vehicle acceleration to which the gust alleviator responds.

In a preferred embodiment of the subject invention there is provided a flight control system employing normal accelerometer feedback signals for reducing aircraft response to gusts, and further comprising signal cancellation means responsive to the pilot's control column for cancelling feedback signals occurring due to aircraft acceleration induced by operation of the control column. Hence, in normal operation of the invention, gust alleviation is effected without compromising vehicle response to maneuvers command by operation of the control column. Accordingly, it is an object of the invention to provide an improved flight controller.

It is another object of the subject invention to provide improved command-control response of an aircraft without compromising performance of an associated gust alleviator.

It is still another object of the invention to provide gust alleviation without compromising the response of the vehicle to commanded maneuvers.

It is yet another object of the invention to provide less complicated gust alleviation systems having improved performance characteristics.

These and other objects of the invention will become apparent from the following description taken together with the accompanying drawing in which:

FIG. 1 is a schematic arrangement of a system employing the concept of the invention.

Referring to FIG. 1, there is illustrated a system employing the concept of the invention. There is provided a flight control system having a control column 10 in cooperation with an artificial feel device 11 and employing accelerometer feedback signals for reducing aircraft response to gusts. There is further provided signal-cancellation means adapted for cancelling that component of the feedback signals due to command operation of the flight control system and comprising a force transducer 12 adapted to cooperate with control column 10.

The exemplary aircraft controls with which the system of FIG. 1 is adapted to cooperate is a fully power system comprising a hydraulic elevator power servo 13 mechanically coupled to control column 10, and an electro-hydraulic wing flap power servo 14 responsive to electrical control signals on line 15.

A servo 16 is interposed in mechanical connection with control column 10 and the input to elevator servo 13 whereby power servo 13 is further responsive to input signals on line 17 applied to the input of series servo 16 from flight stability augmentation means such as for example, a pitch rate gyro 18.

Gust alleviation is provided by means of the feedback signals from an accelerometer 19 oriented to detect vehicle acceleration substantially normal (vertical) to the vehicle flight path, the output of accelerometer 19 being coupled to actuate servo 16 and wing flap power servo 14 in such sense as to induce a vehicle acceleration in opposition to the sensed acceleration.

In operation of the flight control system to a gust, the response of wing flap servo 14 actuates the wing flaps of an aircraft whereby the magnitude of the lift vector is changed so as to compensate for the sensed gust, the elevators of the aircraft cooperating correspondingly. The concurrent operation of the elevators produces very little initial change in lift. However, such lift, acting at a distance aft of the center of gravity of the aircraft, does initially induce pitching moments, which control feature cooperates with the feedback signal to the elevator signal summing means 20 from rate gyro 18 to provide pitch attitude stabilization.

Hence, it is appreciated that the wing flaps on the wing or main lifting surface of a vehicle substantially comprise lift control means, while the conventional elevator surfaces provide moment control means.

Command control of the system of FIG. 1 is achieved by deflection of control column 10, through the application of control forces sufficient to overcome the resistive force provided by artificial feel device 11, whereby power servo 13 is caused to actuate the elevator control surfaces of an aircraft. The force gradient provided by artificial feel device 11 is designed to vary as a function of aircraft flight condition (i.e., airspeed and altitude), in accordance with the variation in the "g" response, or incremental normal acceleration response, of the aircraft to pitch maneuvers. In this way, the pilot of a fully-powered flight control system has a cue or feel for the incremental acceleration to be anticipated from an attempted maneuver. By means of such cue, the pilot is better enabled to avoid over-controlling the aircraft beyond the structural limits thereof, as is well understood in the art.

The mechanical inputs to elevator power servo 13 may be enabled to bias or overcome the stability augmentation inputs to summing means 20 so as to allow performance of a commanded maneuver, by limiting either the amplitude of the stability augmentation signals or by limiting the authority of series servo 16, by means well understood in the art. Such limited authority is adequate for attitude stabilization during non-maneuvering flight. Alternatively, a so-called "wash-out" circuit (i.e., a filter circuit non-responsive to the steady state pitch rates produced by a command maneuver, but responsive to the oscillations of an aircraft "short period" periodic mode of motion requiring to be damped) may be interposed at the output of rate gyro 18, as is well-known in the art. Hence, a pitching maneuver may be performed, which results in a change of angle-of-attack and a consequent build-up or time-lagged change in the aircraft normal acceleration, sensed by accelerometer 19.

The previously described cooperation of accelerometer 19 and wing flap power servo 14 (together with elevator power servo 13) will act to resist such acceleration maneuver in the absence of acceleration signal limiting. Nor is limiting of the accelerometer signals desirable, because such limiting would compromise the effectiveness of the gust alleviation function for large gusts (i.e., when such function is needed most).

Accordingly, signal cancellation means 21 is provided for combining (with the output of accelerometer) a cancellation signal indicative of, and of opposite sense as, that component of the accelerometer output corresponding to the build-up of incremental accelerations in response to deflection of the pilot's control column 10. Such cancellation signal is provided by the output of a frequency sensitive time-lag network 22 responsively coupled to the output of a force transducer 12 mounted on control column 10. Force transducer 12 may be essentially a spring force restrained potentiometer the wiper of which is moved by the pilot's hand grip 23 rotatably mounted on column 10 by means of pivot 24.

When control column 10 is operated against the restraining force of feel device 11, by the pilot applying a manual force to handgrip 23, the applied manual force is indicative of the acceleration to be anticipated from the resulting pitch maneuver.

In such exemplary transducer design, for example, such applied force rotates handgrip 23 and the wiper of the force transducer 12 about pivot 24, whereby the output of transducer 12 (in response to a constant electrical excitation source 25) will be proportional to the applied force and hence proportional to the contemplated amplitude of incremental aircraft accelerations resulting from the deflection of control column 10, regardless of variations of flight condition (in accordance with the force-monitor function provided by artificial feel device 11). The output of transducer 12 is time-lagged by lag network 22 by an amount approximating and corresponding to the time-lag associated with the build-up of aircraft accelerations in response to actuation of the aircraft elevator controls. In other words, the output of lag network 22 in response to operation of control column 12 is an analg of that component of the aircraft acceleration response resulting from operation of the elevator controls by control column 10.

Hence, the differentially combined inputs to summing means 21 (from accelerometer 19 and lag network 22) substantially cancel any feedback signal component indicative of maneuver-induced aircraft accelerations, the output of summing means 21 being a feedback signal substantially indicative of externally induced aircraft accelerations produced by atmospheric anomalies such as gusts and the like. Accordingly, the feedback response of the close dloop accelerometer arrangeemnt of FIG. 1 provides substantially no opposition to pilot-induced maneuvers, while being fully responsive in performing the gust alleviation function. The improved flight control system of FIG. 1 is also adapted to be responsive to so-called outer loop "g" commands from a terminal guidance system or automatic landing system or the like applied to an input terminal 26. Such response is provided by means of a control column servo 27 responsively connected to terminal 26 and arranged to drive control column 10 in cooperation with feel device 11. There is further provided summing means 28 interposed between the output of transducer 12 and lag network 22 and responsively coupled to terminal 26.

In one mode of operation of the arrangement of FIG. 1 to command-control input signals applied to input terminal 26, servo 27 is caused to drive control column 10, effecting actuation of elevator servo 13, whereby the aircraft is caused to correspondingly maneuver in response to such actuation. At the same time, the input to summing network 28 from terminal 26 is lagged by lag network 22 to provide an analog signal indicative of, and of opposite sense as, that component of the output of accelerometer 19 resulting from actuation of elevator servo 13 by the input to terminal 26. Hence, the combination of the output-lagged outer loop "g" command signal and the accelerometer signal by summing means 21 assures that the cooperation of wing flap servo 14 (and series servo 16) in response to sensed accelerations will not tend to oppose such input signals applied to terminal 26.

It is apparent that, without command signal scale changing means such as that ordinarily afforded on artificial feel system, the cancellation signal developed by lag network 22, in response to an outer-loop command input applied to terminal 26, will not vary correspondingly with flight condition as will the cancellation signal developed by manual operation of control column 10. However, where the flight conditions (e.g., combinations of speed and altitude) under which such outer loop system is used are ordinarily sufficiently restricted, then a constant or fixed gain may be successfully employed for the cancellation signal. In other words, the range of flight conditions under which an automatic landing is performed, for example, are such that the "g" sensitivity of the aircraft is substantially constant.

Hence, it is to be appreciated that improved flight control means has been described for providing gust alleviation without compromising vehicle response to commanded maneuvers.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A flight control system employing normal accelerometer feedback signals for reducing aircraft response to gusts, and signal cancellation means responsive to the pilot's control column for cancelling feedback signals due to aircraft acceleration induced by operation of the control column.

2. In a flight control system having a control column in cooperation with an artificial feel system and employing accelerometer feedback signals for reducing aircraft response to gusts, signal cancellation means adapted for cancelling that component of said feedback signals due to operation of said flight control system and comprising a force transducer adapted to cooperate with said control column.

3. In an aircraft having pitching moment and lift controls and an artificial feel and trim system in cooperation with a control column for providing a control force gradient indicative of the incremental lift response of said aircraft to an incremental deflection of the pitching moment control of said aircraft, means for minimizing response of the aircraft to gusts without compromising the response of the aircraft to control system-induced lift acceleration comprising actuation means interposed in mechanical series connection with said control column and said pitching moment controls, a translation accelerometer oriented to detect accelerations substantially normal to the flight path of said aircraft for providing signals for operation of said actuation means and said lift controls in such sense as to oppose such sensed accelerations, a force transducer mounted upon said control column for providing signals indicative of the control force applied to said control column, and signal combining means interposed between said aircraft controls and said output of said accelerometer and responsive to said force transducer.

4. In an aircraft having an artificial feel system in cooperation with a control column and further having a closed loop acceleration control system for reducing the response of an aircraft to gusts, means for improving the vehicle response to a command acceleration maneuver, comprising a force transducer cooperating with said control column for providing a signal indicative of a control force applied to said control column, signal summing means interposed in a feedback signal path of said closed loop acceleration control system and responsive to said stick force sensor; and frequency-sensitive time-lag means interposed between said force transducer and said summing network for providing a signal delay corresponding to the delay in the vehicle acceleration response to deflections of said control column.

5. The device of claim 4 in which there is further provided means adapted to be responsive to a source of a command maneuver signal comprising an input terminal adapted to be connected to a source of a command signal, said signal summing means being responsive to signals applied to said terminal, and a servo actuator responsively connected to said terminal and arranged to drive said control column in mechanical parallel with said artificial feel system.

6. The device of claim 4 in which there is further provided means adapted to be responsive to a source of a command maneuver signal comprising a second signal summing means having a first input terminal adapted to be connected to a source of a command signal, a second input of said second mentioned signal summing means being responsively coupled to the output of said force transducer, frequency-sensitive-lag means interconnecting the output of said second mentioned signal summing means and an input of said first mentioned signal summing means, and a servo actuator responsively connected to said terminal and arranged to drive said control column in mechanical parallel with said artificial feel system.

7. In an aircraft having elevator and wing flap control and an artificial feel and trim system in cooperation with a control column for providing a control force gradient indicative of the incremental acceleration response of said aircraft to an incremental deflection of the elevator controls of said aircraft, means for gust alleviation without compromising aircraft response to a commanded maneuver, comprising an electromechanical servo interposed in mechanical series connection with said control column and said elevator controls, a translational accelerometer oriented to detect accelerations substantially normal to the flight path of said aircraft for providing feedback signals actuating said series servo and said wing flap controls in such sense as to reduce the acceleration sensed by said accelerometer, a force transducer mounted upon said control column for providing electrical signals indicative of the control force applied to said control column, signal combining means interposed between said output of said accelerometer and said aircraft controls and responsive to said force transducer, and a lag network interposed between said force transducer and said signal combining means.

8. In an aircraft having elevator and wing flap controls and an artificial feel system in cooperation with a control column for providing a control force gradient indicative of the incremental acceleration response of said aircraft to an incremental deflection of the elevator controls of said aircraft, the combination comprising a translational accelerometer mounted and oriented to detect accelerations substantially normal to the flight path of said aircraft for providing feedback signals for actuation of said elevator and wing flap controls in such sense as to reduce the acceleration sensed by said accelerometer;

first signal summing means interposed between the inputs to said aircraft controls and the output of said accelerometer;

second summing means interposed between the input to said elevator controls and the output of said first summing means, a second input of said second summing means being adapted to be connected to a source of rate stability augmentation signals;

an input terminal adapted to be connected to a source of command maneuver signals;

a servo actuator responsively connected to said terminal and arranged in mechanical parallel with said artificial feel system for driving said control column;

a force transducer mounted upon said control column for providing electrical signals indicative of the control force applied to said control column;

third signal summing means responsive to said input terminal and said force transducer, a second input of said first summing means being responsively coupled to the output of said third summing means; and frequency-responsive time-lag means interposed between the output of said third summing means and said second input of said first summing means for providing a signal-delay corresponding to the build-up of vehicle acceleration due to deflection of said aircraft controls, whereby the acceleration response of said vehicle to gusts is minimized without compromising such vehicle response to commanded maneuver inputs.

References Cited by the Examiner
UNITED STATES PATENTS 3,033,496   5/1962   Brands _____ 244—770

FERGUS S. MIDDLETON, *Primary Examiner.*

ANDREW H. FARRELL, *Examiner.*